June 19, 1962    J. S. HAWIE    3,039,461
FASTENER FOR ELASTIC BANDAGE
Filed July 23, 1959
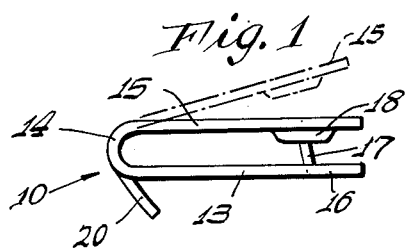
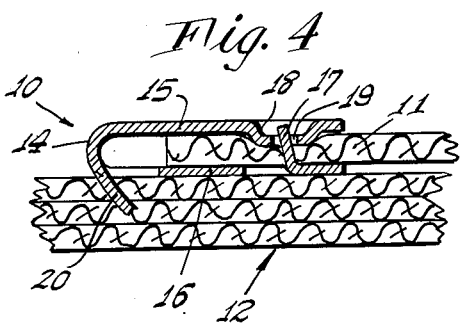
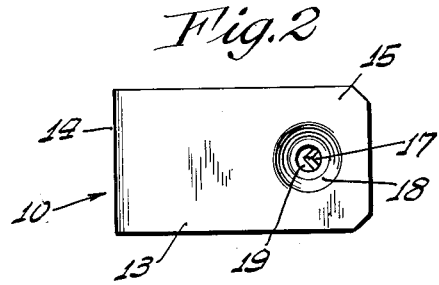
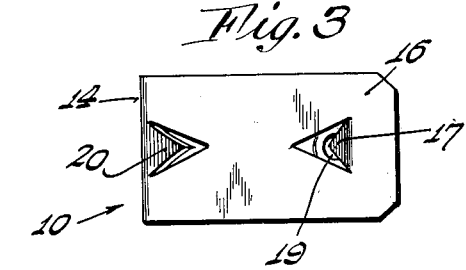
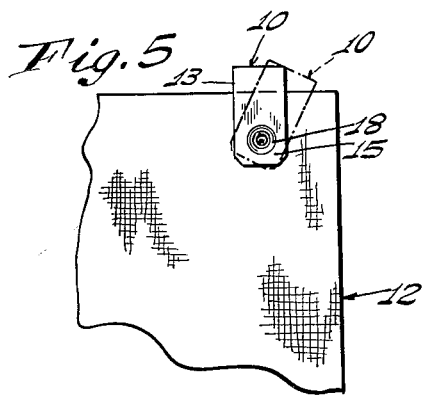
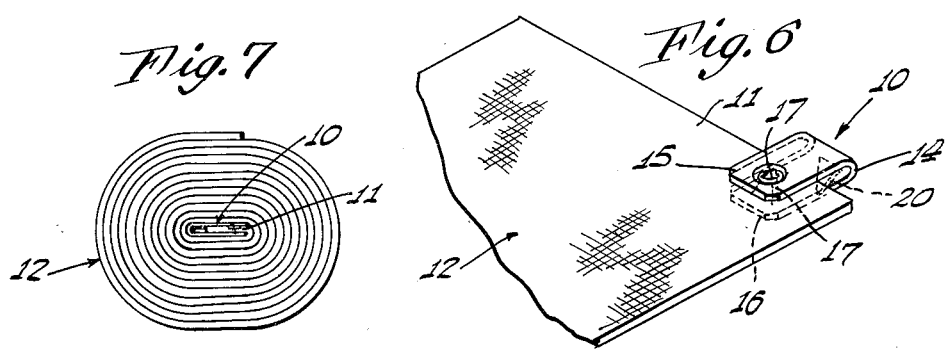
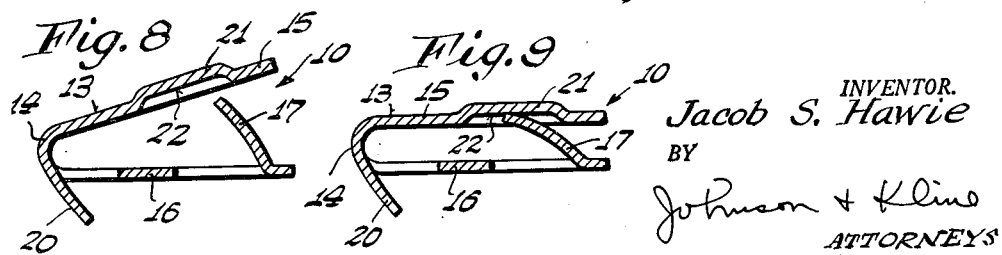
INVENTOR.
Jacob S. Hawie
BY
Johnson & Kline
ATTORNEYS

United States Patent Office 3,039,461
Patented June 19, 1962

3,039,461
FASTENER FOR ELASTIC BANDAGE
Jacob S. Hawie, Easton, Conn., assignor to The Hawie Manufacturing Company, Bridgeport, Conn., a corporation of Connecticut
Filed July 23, 1959, Ser. No. 829,013
8 Claims. (Cl. 128—171)

This invention relates to fasteners. More specifically, it pertains to fasteners for securing the trailing end of a wrap-around elastic bandage against accidental displacement during the use of the bandage.

Heretofore, elastic wrap-around bandages of the "Ace" type have had their trailing ends secured against accidental displacement, when in use, by fasteners which removably engage both the trailing end of the bandage and the body thereof. These fasteners, while they have served their purpose, present problems in that they are easily lost and must be connected to the trailing end of the bandage as well as to some other part thereof before the trailing end is secured against displacement.

The present invention overcomes the problems aforenoted and provides a fastener for elastic bandages which is carried by the bandage at one end thereof and is so positioned as to be readily utilized in securing the end, to which it is attached, against displacement during the use of the bandage.

It is an object of the invention to provide a fastener for elastic bandages which is fixedly secured to an end of the bandage so that it is rolled within the bandage in the stored position thereof and is disposed at the trailing end of the same when it is positioned in use to secure the trailing end against accidental displacement.

It is also an object of the invention to provide a fastener including opposed flap members adapted to engage opposed sides of an end of the bandage having means cooperating therebetween for pivotally fixedly securing the fastener to the bandage.

An important feature of the invention resides in the pivotal adjustability of the fastener relative to the bandage, whereby it is enabled to be aligned with the strain imparted to it so that it is not accidentally displaced.

Another object of the invention is to provide a fastener which is inexpensive, readily manufactured by quantity production methods and adapted to be pressed into locked engagement with an end of an elastic bandage to be carried thereby.

Other objects and advantages will be apparent from the specification and claims when considered in connection with the attached sheet of drawings, illustrating one form of the invention, wherein like characters represent like parts, and in which:

FIGURE 1 is a side elevational view, in solid and dotted lines, showing one form of fastener according to the invention;

FIG. 2 is a top plan view of the fastener of FIG. 1;

FIG. 3 is a bottom plan view of the fastener of FIG. 1;

FIG. 4 is a fragmentary sectional view of the fastener of FIG. 1 shown connected to the trailing end of an elastic bandage and retaining the same against displacement when the bandage is in use;

FIG. 5 is a fragmentary plan view of an elastic bandage having a fastener according to the invention secured thereto and showing in dotted lines the shiftability of the fastener relative to the bandage;

FIG. 6 is a fragmentary perspective view, partially in dotted lines showing an elastic bandage with the fastener of the invention connected thereto;

FIG. 7 shows an elastic bandage in rolled stored position with the fastener of the invention shown positioned inwardly of the roll;

FIG. 8 is an elevational view, in section, of an alternative form of fastener in open position; and FIG. 9 is an elevational view, in section, of the fastener of FIG. 8 in closed position.

Referring now to the drawings for a more detailed description of the invention, in FIGS. 1 through 7 a fastener 10 is shown for securing the trailing end 11 of a wrap-around elastic bandage 12 against accidental displacement when the bandage is positioned in use. The fastener, which is preferably made of some deformable material, such as sheet metal or the like, that will retain its deformed shape, comprises a thin flat strip 13 folded back upon itself along a substantially intermediate fold line 14 providing a pair of opposed flap members 15 and 16 adapted to engage opposed surfaces of the trailing end 11 of the bandage. While the fastener 10 may be formed in engagement with the end 11 of the elastic bandage 12, with the flap members 15 and 16 in substantially parallel relation and engaging the opposed surfaces of the trailing end of the bandage, in the illustrated form of the invention the strip 13 is formed with the flap members 15 and 16 spread or in open position, as shown in dotted lines in FIG. 1 to be assembled with the bandage at some later time.

In accordance with the invention, one of the flap members, here flap 16, is provided with an integral inwardly formed tongue 17. The tongue 17, which extends in the direction of the other flap member, or flap 15, is adapted to piercingly engage the trailing end of the bandage securing the fastener 10 thereto. The flap member 15 is provided with means for locking the tongue in bandage engaging position for preventing displacement of the fastener from the bandage. In the form of the invention shown in FIGS. 1 through 7 flap member 15 is formed with an inwardly extending bulge 18 having an opening 19 therethrough which is adapted to receive the end of tongue 17 to prevent the stripping of the bandage from the tongue. It will be seen that in this structure the end of the tongue is disposed below the outer surface of flap 15 and, therefore, cannot snag clothing or the like coming in contact with the fastener.

The flap member 16 is formed with a second tongue 20, extending outwardly therefrom in a direction away from flap member 15, which is adapted to removably piercingly engage a portion of the body of elastic bandage 12 when the latter is positioned in use. The tongue 20, which is integral with flap 16 and adjacent fold line 14, is directed away from the fold line toward the opposite end of the flap to facilitate removably engaging the bandage under tension (see FIG. 4) so that trailing end 11 thereof is retained against accidental displacement.

The fastener 10, which may be connected to the bandage at the place of manufacture or at any time prior to its initial use, is disposed over the trailing end 11 of the bandage and the flap members 15 and 16 are pressed toward each other so that they engage opposed surfaces of the bandage (see FIGS. 4 and 6). The deformable nature of the material from which the fastener is fabricated, as above described, retains the flap members in engagement with the opposed surfaces of the bandage. When the flap members are pressed toward one another, tongue 17 pierces the bandage and extends into the opening 19 of bulge portion 18, thereby preventing the bandage from separating from the fastener. After the fastener has been affixed to the bandage and it is desired to store the same for shipping or the like, the bandage is rolled (see FIG. 7) with the trailing end 11, carrying the fastener 10, at the center of the roll. In this manner, when the bandage is positioned in use, unrolling the bandage and wrapping it in position will dispose the trailing end thereof at the outside of the bandage so that the fastener may be utilized to retain the end against accidental displacement.

It will be understood by those familiar with elastic bandages that it is important in certain applications of the same, such as where they are utilized to bind a knee joint or the like, that the fastener be positioned so that flexing strain will be aligned with the length of the fastener, exerting a pull against tongue 20, to prevent accidental separation thereof from engagement with the bandage. The present invention facilitates aligning the fastener with the direction of pull thereon since the fastener is pivotally movable around tongue 17 relative to the end of the bandage. It is merely necessary for the person applying the bandage to swing or pivot the fastener, as shown in solid and dotted lines in FIG. 5, around the tongue to obtain the most effective position of the fastener for securing the trailing end of the bandage against accidental displacement. Thereafter, when the fastener has been positioned relative to the bandage so that strain is applied to it in a direction opposed to tongue 20 and the bandage has been wrapped in position, the bandage is tensioned in the usual manner and tongue 20 of the fastener is pressed into piercing removable engagement with the body of the bandage.

In FIGS. 8 and 9 of the drawings, an alternative form of fastener 10 is shown, wherein the flap member 15 is provided with an outwardly bulged portion 21 for cooperating with the tongue 17 to lock the fastener to the trailing end of the bandage. In this form of the invention, on pressing flap members 15 and 16 toward each other into engagement with opposed sides of the end of the bandage, the tongue 17, after piercing the bandage, is cammed by the inner surface 22 of the bulged portion 21 in the direction of fold line 14 so that the bandage is prevented from being stripped from the tongue.

It will be seen that the present invention has provided a fastener for elastic bandages, which may be readily, inexpensively manufactured by mass modern production methods on stamping machines or the like, that is adapted to be permanently carried by the bandage while being adjustable relative thereto for alignment with strains applied to the fastener.

Thus, among others, the several objects and advantages of the invention as aforenoted are achieved. Obviously numerous changes in the structure may be resorted to without departing from the spirit of the invention as defined by the claims.

I claim:

1. A fastener for securing the trailing end of a wrap-around elastic bandage comprising a strip of deformable material folded back upon itself providing a pair of opposed flap members adapted to be pressed into engagement with opposed sides of an end of an elastic bandage, pivot means comprising a tongue forming part of one of said flap members cooperating with socket means on the other of said flap members for fixedly pivotally securing said strip to said end of the bandage and further means including a projecting part of one of said members extending rearwardly from the fold in the strip for removably engaging the elastic bandage so that the end thereof to which said fastener is attached is secured against displacement when the bandage is in use.

2. A fastener for securing the trailing end of an elastic bandage comprising a strip of deformable material folded back upon itself providing a pair of opposed flap members adapted to be engaged with opposed sides of an end of an elastic bandage, a lanced-out tongue forming part of one of said flap members and directed toward said other flap member for fixedly pivotally engaging said end of the bandage so that said strip is secured thereto and tongue means forming part of one of said flap members and directed away from said other flap member for removably engaging the elastic bandage to secure the end thereof to which the fastener is attached against displacement when the bandage is in use.

3. A fastener for securing the trailing end of an elastic bandage comprising a flat thin strip of deformable material folded back upon itself providing a folded edge connecting a pair of opposed flap members adapted to be engaged with opposed sides of an end of an elastic bandage, a tongue inclined toward the folded edge forming part of one of said flap members and directed inwardly toward said other flap member for pivotally engaging said end of the bandage, means forming part of said other flap member for engaging the end of said tongue to fixedly secure said strip to the end of said bandage and a tongue forming part of one of said flap members directed outwardly thereof away from said other flap member and rearwardly with respect to the folded edge for removably engaging the elastic bandage so that the end thereof to which said strip is attached is secured against displacement when the bandage is in use.

4. A fastener for securing the trailing end of an elastic bandage comprising a strip of deformable material folded back upon itself providing a folded edge connecting a pair of opposed flap members adapted to be engaged with opposed sides of an end of an elastic bandage, a tongue struck inwardly of one of said flap members in the direction of said other flap member for piercing said end of said elastic bandage, said other flap member being bulged inwardly toward said first flap member and provided with an opening in said bulged portion adapted to receive the end of said tongue so that said fastener is fixedly attached to said end of the bandage and is adapted to be pivoted relative thereto and a second tongue struck outwardly of one of said flap members in a direction away from said other flap member and away from the folded edge for removably piercing the elastic bandage so that the end thereof to which said fastener is attached is secured against displacement when the bandage is in use.

5. A fastener for securing the trailing end of an elastic bandage comprising a strip of deformable metal folded back upon itself along a substantially intermediate fold line and providing a pair of opposed flap members adapted to be engaged with opposed sides of an end of an elastic bandage, a tongue struck inwardly within the edges of one of said flap members in the direction of said other flap member and adapted to pierce said end of the bandage so that said strip is pivotally connected thereto, means forming part of said other flap member for locking said tongue in bandage engaging position, and a second tongue struck outwardly of one of said flap members adjacent said fold line and directed away from said fold line and said other flap member, said second tongue being adapted to removably pierce the elastic bandage to secure the end thereof to which said fastener is attached against displacement when the bandage is in use.

6. The combination of a wrap-around elastic bandage and fastener fixedly pivotally connected to an end of the bandage and disposed inwardly thereof in the rolled stored position of the bandage so that on positioning the bandage in use the fastener is disposed at the trailing end, said fastener comprising a strip of deformable material folded back upon itself and providing a pair of opposed flap members adapted to engage opposed sides of said end of said bandage, tongue means forming part of one of said flap members and extending toward said other flap member for piercingly fixedly securing said strip thereto and further tongue means forming part of one of said flap members directed away from said other flap member for removably engaging said bandage to secure the said trailing end thereof against accidental displacement.

7. In the combination of a wrap-around elastic bandage and a fastener for securing the trailing end of the bandage against displacement during use; the improvement wherein said fastener is fixedly carried by said trailing end and comprises a strip of deformable material folded back upon itself providing opposed flap members adapted to engage opposed surfaces of said end of the bandage, means forming part of one of the flap members and cooperating with the other flap member for pivotally connecting the strip to said trailing end and further means forming part of one of the flap members directed away from the other flap member for removably engaging the bandage, whereby the trailing end is secured during use of the bandage.

8. A fastener for securing the trailing end of a wrap-around elastic bandage comprising a member provided with a pair of opposed flap members adapted to be engaged with opposed sides of an end of an elastic bandage, pivot means forming part of one of said flap members for fixedly pivotally securing said fastener to said bandage and further means including a rearwardly extending projecting tongue on one of said flap members for removably engaging the elastic bandage so that the end thereof to which said fastener is attached is secured against displacement when the bandage is in use.

References Cited in the file of this patent

UNITED STATES PATENTS

| | | |
|---|---|---|
| 131,174 | Marston | Sept. 10, 1872 |
| 1,212,731 | Banks | Jan. 16, 1917 |
| 1,420,812 | Brown | June 27, 1922 |
| 1,465,717 | Mercer | Aug. 21, 1923 |
| 1,845,605 | Joyce | Feb. 16, 1932 |
| 2,645,222 | Capossela | July 14, 1953 |
| 2,687,723 | Stern | Aug. 31, 1954 |
| 2,896,294 | Cheney | July 28, 1959 |

FOREIGN PATENTS

| | | |
|---|---|---|
| 523,142 | Germany | Apr. 20, 1931 |